United States Patent
Saw et al.

(10) Patent No.: US 11,101,754 B2
(45) Date of Patent: Aug. 24, 2021

(54) STALL DETECTION IN STEPPER MOTORS USING DIFFERENTIAL BACK-EMF BETWEEN RISING AND FALLING COMMUTATION PHASE OF MOTOR CURRENT

(71) Applicant: Texas Instruments Incorporated, Dallas, TX (US)

(72) Inventors: Sooping Saw, McKinney, TX (US); Rakesh Raja, Allen, TX (US); Wen Pin Lin, Allen, TX (US); Sudhir Nagaraj, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/869,617

(22) Filed: May 8, 2020

(65) Prior Publication Data
US 2020/0266740 A1    Aug. 20, 2020

Related U.S. Application Data

(63) Continuation of application No. 16/134,046, filed on Sep. 18, 2018, now Pat. No. 10,686,391.

(60) Provisional application No. 62/570,683, filed on Oct. 11, 2017.

(51) Int. Cl.
| | |
|---|---|
| *H02P 8/38* | (2006.01) |
| *H02P 8/34* | (2006.01) |
| *H02P 8/12* | (2006.01) |

(52) U.S. Cl.
CPC ............... *H02P 8/38* (2013.01); *H02P 8/12* (2013.01); *H02P 8/34* (2013.01)

(58) Field of Classification Search
CPC .................................................. H02P 8/38
USPC ...................................... 318/696, 34
See application file for complete search history.

(56) References Cited

U.S. PATENT DOCUMENTS

| | | | |
|---|---|---|---|
| 5,350,992 A | 9/1994 | Colter | |
| 5,793,174 A * | 8/1998 | Kovach | E06B 9/262 318/16 |
| 6,586,898 B2 | 7/2003 | King | |
| 7,705,555 B2 * | 4/2010 | Pinewski | H02P 8/36 318/696 |
| 8,179,068 B2 | 5/2012 | Yuuki | |
| 9,013,133 B2 * | 4/2015 | Russ | H02P 8/22 318/696 |

* cited by examiner

*Primary Examiner* — David Luo
(74) *Attorney, Agent, or Firm* — Charles F. Koch; Charles A. Brill; Frank D. Cimino

(57) ABSTRACT

In one embodiment, a method includes detecting, by a stall detection sensor in a driver coupled to a stepper motor, a first set of time-off periods in a rising commutation phase of motor current during current regulation. The stall detection sensor further detects a second set of time-off periods in a falling commutation phase of motor current during current regulation. Next, the stall detection sensor compares the first set of time-off periods with the second set of time-off periods and determines whether the stepper motor is stalled based on the comparison of the first set of time-off periods with the second set of time-off periods.

19 Claims, 6 Drawing Sheets

STALL DETECTION IN STEPPER MOTORS USING DIFFERENTIAL BACK-EMF BETWEEN RISING AND FALLING COMMUTATION PHASE OF MOTOR CURRENT

PRIORITY

This application is a continuation of U.S. patent application Ser. No. 16/134,046, filed Sep. 18, 2018, which claims the benefit, under 35 U.S.C. § 119(e), of U.S. Provisional Patent Application No. 62/570,683, filed 11 Oct. 2017, both of which are incorporated herein by reference.

TECHNICAL FIELD

This disclosure generally relates to stepper motors, and, in particular, stall detection sensors in stepper motors.

BACKGROUND

Stepper motors are externally commutated motors commonly used for positional tasks. In particular, a stepper motor provides a precise mechanical motion in response to pulsed signals. Unlike DC brushed motors that run at speeds determined by electrical potentials, the stepper motor rotates from one position to another in a precise incremental rotation in each step. A controller provides the pulsed signals needed to advance the stepper motor. A stepper motor may have a toothed iron gear that aligns to magnets surrounding the gear. The gear changes position in response to current applied to coils. A pulse width modulation ("PWM") circuit may apply pulses to the coils. Moreover, an open loop operation is used to control and operate stepper motors. In this open loop methodology, a driver sends commutation signals to the motor.

Due to the open-loop operation of stepper motors, stepper motors do not provide feedback on whether the motor is stationary (e.g., stalled). A stationary motor can be caused by several conditions. For example, rotation of the electrical field generated by the driver may lose synchronicity with mechanical rotation of the stator, or the mechanical load may exceed the drive capability of the motor. Any obstruction of the load path, including a fixed mechanical stop, also can cause the motor to stop rotating. In these instances, without information on absolute position, the motor will attempt to drive through the obstruction in order to ensure that the load reaches the end point. This can cause wear, audible noise, heating, and mechanical failures. Moreover, several applications require knowledge of whether the motor is operating (e.g., diagnostic information) or the motor has reached the end of travel detection (e.g., position sensing).

Reliable sensorless stall detection for stepper motors across wide system parameters (e.g., supply voltage changes, wide supply ranges, various temperatures, wide motor speed ranges, various motor currents), however, are difficult to achieve.

SUMMARY OF PARTICULAR EMBODIMENTS

In one embodiment, a method includes detecting, by a stall detection sensor in a driver coupled to a stepper motor, a first set of time-off periods in a rising commutation phase of motor current during current regulation. The stall detection sensor further detects a second set of time-off periods in a falling commutation phase of motor current during current regulation. Next, the stall detection sensor compares the first set of time-off periods with the second set of time-off periods and determines whether the stepper motor is stalled based on the comparison of the first set of time-off periods with the second set of time-off periods.

The disclosure may present several technical advantages. A technical advantage of the stall detection sensor may include operability for full step stepper motor operations. In addition, another technical advantage of the stall detection sensor may include increased reliability over a wide array of conditions, including changes in supply voltage, motor current, and/or temperature. Moreover, another technical advantage of the stall detection sensor may include increased reliability over wide voltage ranges, wide motor speeds, wide current range of motor, and wide temperature ranges. In addition, another additional advantage may include detecting a startup stall condition of the motor.

Other technical advantages of the present disclosure will be readily apparent to one skilled in the art from the following figures, descriptions, and claims. Moreover, while specific advantages have been enumerated above, various embodiments may include all, some, or none of the enumerated advantages.

Moreover, the embodiments disclosed herein are only examples, and the scope of this disclosure is not limited to them. Particular embodiments may include all, some, or none of the components, elements, features, functions, operations, or steps of the embodiments disclosed above. Embodiments are in particular disclosed in the attached claims, wherein any feature mentioned in one claim category, e.g. method, can be claimed in another claim category, e.g. system, as well.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DESCRIPTION OF EXAMPLE EMBODIMENTS

Stepper motors can be found in a variety of modern day applications. For example, stepper motors find use in many automotive applications, including headlight leveling; adaptive headlamps, in which the headlamps turn right or left with the steering wheel; exhaust-gas-recirculation ("EGR") valves; and adjustable mirrors. As another example, stepper motors may be found in automated teller machines ("ATMs"), sewing machines, and printers.

These stepper motors are externally commutated motors commonly used for positional tasks. In particular, a stepper motor provides a precise mechanical motion in response to pulsed signals. Unlike direct current ("DC") brushed motors that run at speeds determined by electrical potentials, the stepper motor rotates from one position to another in a precise incremental rotation in each step. A controller provides the pulsed signals needed to advance the stepper motor. A stepper motor may have a toothed iron gear that aligns to magnets surrounding the gear. The gear changes position in response to current applied to coils. A pulse width modulation ("PWM") circuit may apply pulses to the coils. Moreover, an open loop methodology is used to control and operate stepper motors. In this open loop methodology, a driver sends commutation signals to the motor.

Due to the open-loop operation of stepper motors, stepper motors do not provide feedback on whether the motor is operating. However, several applications require knowledge of whether the motor is operating (e.g., diagnostic information) or the motor has reached the end of travel detection (e.g., position sensing). Reliable sensorless stall detection for stepper motors across wide system parameters (e.g., supply voltage changes, wide supply ranges, various temperatures, wide motor speed ranges, various motor currents) are difficult to achieve.

To reliably sense stall detection without the use of sensors, the disclosure describes differentially measuring a back electromotive force ("back-EMF") voltage to detect a stall in a stepper motor. In one embodiment, a method includes detecting, by a stall detection sensor in a driver coupled to a stepper motor, a first set of time-off periods in a rising commutation phase of motor current during current regulation. The stall detection sensor further detects a second set of time-off periods in a falling commutation phase of motor current during current regulation. Next, the stall detection sensor compares the first set of time-off periods with the second set of time-off periods and determines whether the stepper motor is stalled based on the comparison of the first set of time-off periods with the second set of time-off periods.

Figure 1:
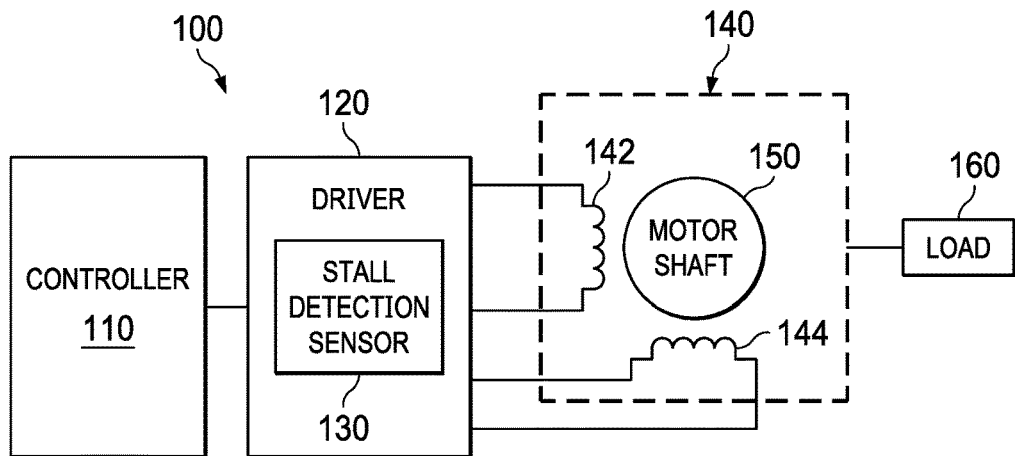
FIG. 1 illustrates an exemplary stepper motor environment comprising a controller, a driver with a stall detection sensor, a stepper motor system, and a load.

FIG. 1 illustrates exemplary stepper motor environment 100 comprising controller 110, driver 120 (with stall detection sensor 130), stepper motor system 140 (with first coil 142, second coil 144, and stepper motor shaft 150), and load 160.

Controller 110 may be any type of controller that may control the speed, direction, micro-stepping, torque, and/or any other variable characteristics of driver 120 and/or stepper motor system 140.

Driver 120 provides electrical signals to induce the rotation of stepper motor shaft 150 in stepper motor system 140 through first coil 142 and second coil 144. Driver 120 may regulate the motor current through the two motor coils in a sinusoidal manner that are 90° out of phase with each other. Generally, without current regulation, the motor current will build up to large value and damage stepper motor system 140 and the driver integrated circuits (ICs). The sinusoidal waveform is implemented typically through micro-stepping of different resolutions (e.g., half, ¼, ⅛, 1/16, etc.). Each step results in certain percentage current through the two coils and results in a particular position of the motor.

In particular, driver 120 may provide PWM control. PWM control works by driving the motor with a series of "ON-OFF" pulses and varying the duty cycle (i.e., the fraction of time that the output voltage is "ON" compared to when the output voltage is "OFF") of the pulses while the frequency is constant. The time period when the output voltage is "ON" is the time-on period, and the time period when the output voltage is "OFF" is the time-off period. Driver 120 can control the power applied to stepper motor system 140 by varying the width of these applied pulses, thereby varying the average DC voltage applied to stepper motor system 140. By changing or modulating the timing of these pulses, the speed of stepper motor system 140 can be controlled. For example, the longer the pulse is "ON," the faster stepper motor system 140 will rotate. Likewise, the shorter the pulse is "ON," the slower stepper motor system 140 will rotate.

Stepper motor system 140 provides a means for precise positioning and speed control of the rotation and positioning of stepper motor shaft 150 typically without the use of feedback sensors. The basic operation of stepper motor system 140 allows stepper motor shaft 150 to move a precise number of degrees each time a pulse of electricity from driver 120 is sent to stepper motor system 140. Since stepper motor shaft 150 moves only the number of degrees that it was designed for when each pulse is delivered, controller 110 can control the pulses that are sent and control the positioning and speed of stepper motor shaft 150 through driver 120.

Moreover, controller 110 instructs driver 120 to commutate first coil 142 and second coil 144 approximately in a sinusoidal fashion in order to rotate stepper motor shaft 150. As discussed in further detail in FIGS. 2-5, driver 120 regulates steps (e.g., microsteps or full-steps) in order to replicate the sinusoidal signal to rotate stepper motor shaft 150. To replicate the sinusoidal signal, driver 120 provides current-regulated steps by PWM control. As discussed in further detail in FIG. 4, the current-regulated steps may have a rising commutation phase and a falling commutation phase.

As stepper motor shaft 150 rotates based on the average driving motor voltage ("$V_m$") on first coil 142 and second coil 144, a magnetic field known as back-EMF develops and acts against the applied voltage on first coil 142 and second coil 144. As the motor rotation of stepper motor shaft 150 increases (due to the increased $V_m$), the back-EMF proportionally increases. Similarly, as the motor rotation of stepper motor shaft 150 decreases, the back-EMF proportionally decreases.

Driver 120 may comprise stall detection sensor 130. Stall detection sensor 130 detects a stall in stepper motor system 140 by differentially measuring the back-EMF in stepper motor system 140. Upon detecting a stall, stall detection sensor 130 may indicate to another component (e.g., controller 110 through a pin) that a stall event has occurred. In turn, appropriate action may be taken. In certain embodiments, stall detection sensor 130 may also stop stepper motor system 140 from driving upon detecting a stalled motor condition.

First coil 142 and second coil 144 may be an electrical conductor, such as a wire, that generates a magnetic field as electric current is passed through first coil 142 and/or second coil 144. While illustrated as first coil 142 and second coil 144, stepper motor system 140 may contain any number of coils. The magnetic field induces a rotation of stepper motor shaft 150.

Stepper motor shaft 150 may move load 160. Load 160 may be a variety of equipment that moves in relation to the rotation of stepper motor system 140. For example, load 160 may be adaptive automotive headlamp, automated sewing machine system components, ATM machine components, surveillance system cameras, and printer system components. However, stepper motor system 140 may stall and, accordingly, may not impact load 160. For example, an obstruction in the path of load 160 may exit, causing a fixed mechanical stop of stepper motor system 140. As another example, stepper motor system 140 may stall at the outset (e.g., start-up stall) and stepper motor shaft 150 may never move in the first place. Additionally, the stepper motor system 140 may stall if load 160 exceeds the maximum load that may be driven by the drive torque applied by driver 120.

In an exemplary embodiment, stall detection sensor 130 detects a first set of time-off periods in a rising commutation phase of motor current during current regulation. In certain embodiments, the first set of time-off periods is a first set of time-off periods in a rising commutation phase in a first half of a motor current cycle.

Stall detection sensor 130 detects a second set of time-off periods in a fall commutation phase of motor current during current regulation. In certain embodiments, the second set of time-off periods is a second set of time-off periods in a falling commutation phase in a first half of a motor current cycle.

Stall detection sensor 130 compares the first set of time-off periods with the second set of time-off periods. In addition, in certain embodiments, stall detection sensor 130 compares an average of the first set of time-off periods with an average of the second set of time-off periods. In particular embodiments, stall detection sensor 130 compares an inverse of the average of the first set of time-off periods with an inverse of the average of the second set of time-off periods.

Next, stall detection sensor 130 determines whether stepper motor shaft 150 is stalled based on the comparison of the first set of time-off periods with the second set of time-off periods. In particular embodiments, stall detection sensor 130 determines whether stepper motor shaft 150 is stalled by comparing the first set of time-off periods with the second set of time-off periods and determining that stepper motor shaft 150 is stalled when a difference in time between the first set of time-off periods and the second set of time-off periods is below a threshold.

In additional embodiments, stall detection sensor 130 may detect a third set of time-off periods in a rising commutation phase in a second half of a motor current cycle during current regulation. Moreover, stall detection sensor 130 may detect a fourth set of time-off periods in a falling commutation phase in the second half of the motor current cycle. Stall detection sensor 130 may then compare the third set of time-off periods with the fourth set of time-off periods. In addition, in certain embodiments, stall detection sensor 130 may also determine whether stepper motor shaft 150 is stalled based on the comparison of the third set of time-off periods with the fourth set of time-off periods.

Figure 2:
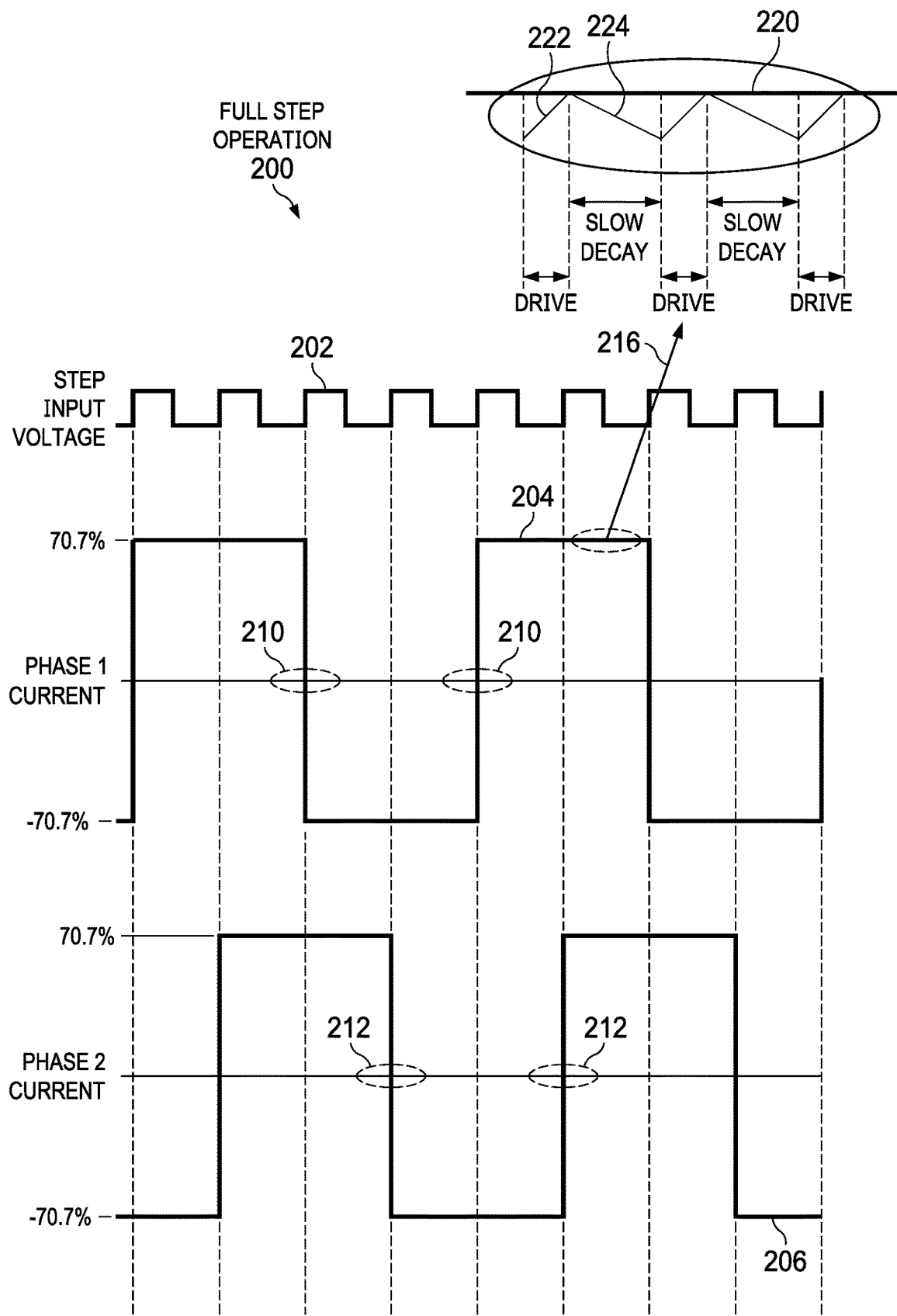
FIG. 2 is a graph showing the phase currents of a stepper motor in a full-step operation.

FIG. 2 is a graph 200 showing the phase currents of a stepper motor in a full-step operation. The horizontal axis is time for graph 200, and the vertical axis is voltage for step input 202, the current for the phase 1 current 204, and the current for the phase 2 current 206. The phase currents are shown as steady state current levels; however, enlargement 216 of a portion of the phase 1 current 204 waveform more accurately shows that the steady state line 220, representing the almost constant current level, is comprised of a series of small saw tooth current drives 222 and decays 224. These small saw tooth current drives 222 and decays 224 are discussed in further detail in FIG. 5. The current is regulated to maintain the approximately constant current level using the PWM signals from driver 120.

In full-step stepper motor operation, neither of the phases are in a non-driven period, which leaves no opportunity to directly measure the back-EMF voltage. The zero crossings 210 in the phase 1 current 204 waveform and the zero crossings 212 in phase 2 current 206 waveform show that the current does not stop at zero amps. In a micro-stepper motor operation mode (e.g., the half-step operation displayed in FIG. 3), there is a time that the coil is at zero current; however, the time the coil current is a zero current is often too short to allow time to measure the back-EMF voltage.

Figure 3:
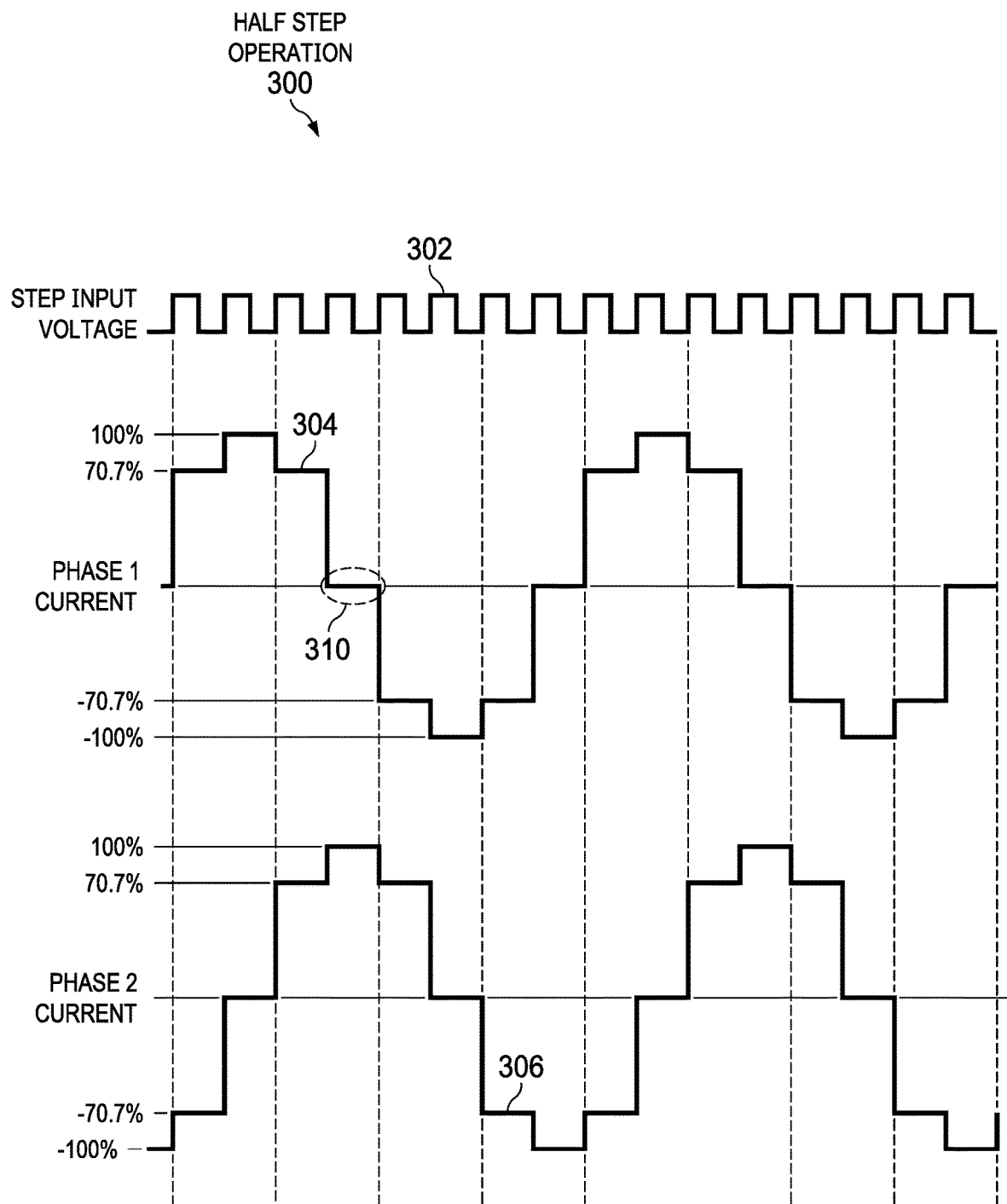
FIG. 3 is a graph showing the phase current of a stepper motor in a half-step operation.

FIG. 3 is a graph showing the phase current of a stepper motor in half-step operation. In graph 300, the horizontal axis represents time, and the vertical axis represents the voltage for step input 302, the current for phase 1 current 304, and the current for phase 2 current 306. The steady state current level representations for the phase currents are comprised a series of small saw tooth current ramps similar to the enlargement 216 in FIG. 2. In half-step operation, the phase 1 current 304 waveform has a portion of time 310 that the drivers are not driving and the current is at zero amps. A back-EMF measurement may be made when the phase current is zero and enough time is available for the transient coil current to decay revealing the true back-EMF voltage. However, as the motor speed increases, the available time for the measurement shortens and eventually the time a measurement can be made is too short for an accurate back-EMF measurement. For quarter step or higher step operation, the time at zero current is even smaller, resulting in significant restrictions for measuring back-EMF voltage. At higher motor speeds the direct measurement approaches fail for lack of time to complete the back-EMF measurement.

Figure 4:
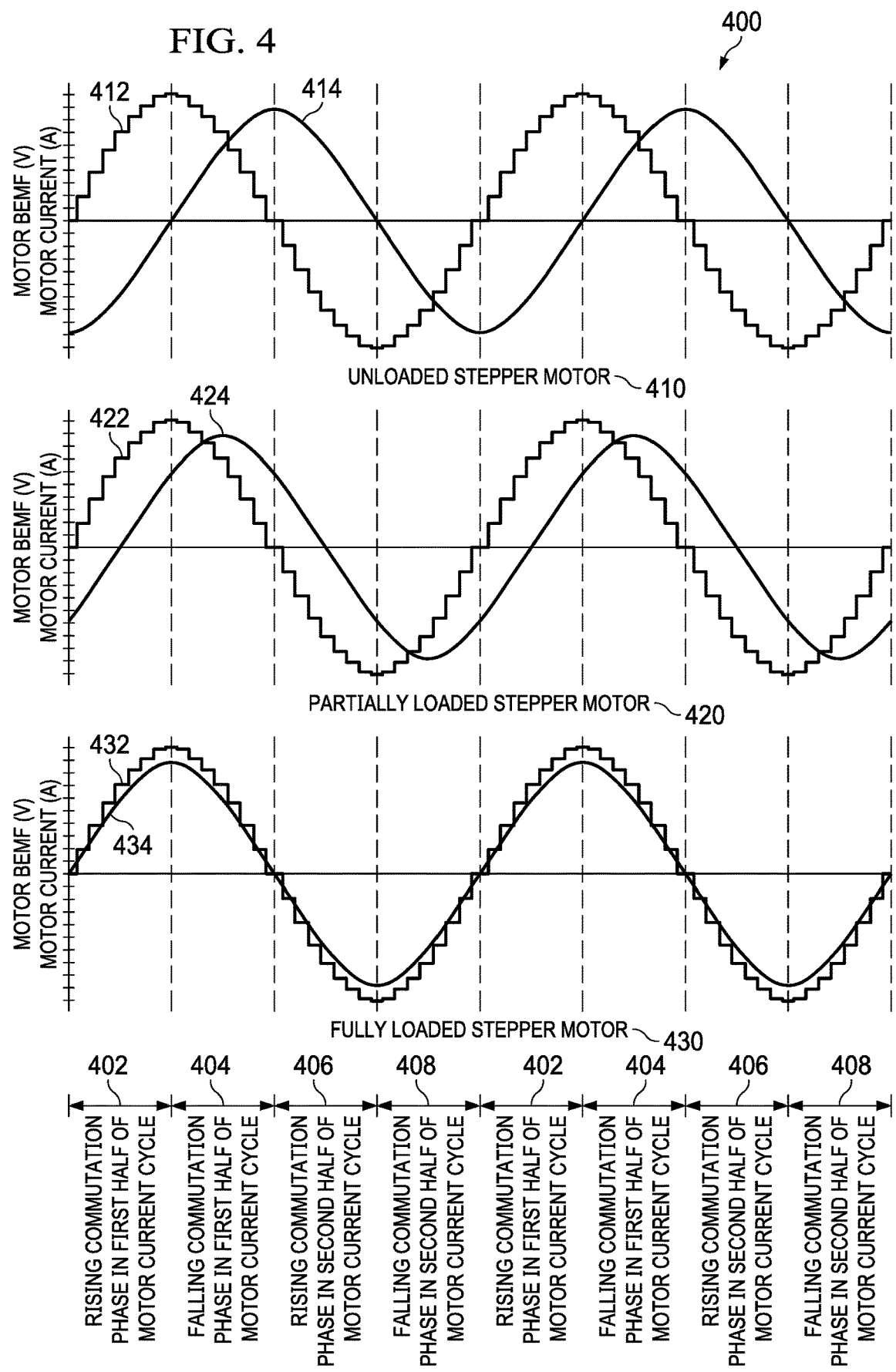
FIG. 4 is a graphical illustration of the phase difference between motor current and back electromagnetic forces ("back-EMF").

FIG. 4 is a graphical illustration of the phase difference between motor current and back-EMF. The phases of the motor current are illustrated across four different time periods: (1) rising commutation phase in the first half of motor current cycle 402; (2) falling commutation phase in the first half of motor current cycle 404; (3) rising commutation phase in the second half of motor current cycle 406; and (4) falling commutation phase in the second half of motor current cycle 408. An entire motor current cycle consists of a combination of rising commutation phase in the first half of motor current cycle 402, falling commutation phase in the first half of motor current cycle 404, rising commutation phase in the second half of motor current cycle 406, and falling commutation phase in the second half of motor current cycle 408.

The time periods typically are representative of the stage of the motor current transmitted from driver 120. During rising commutation phase in the first half of motor current cycle 402, an increasing positive motor current is driven from driver 120 to stepper motor system 140. During falling commutation phase in the first half of motor current cycle 404, a decreasing positive motor current is driven from driver 120 to stepper motor system 140. During falling commutation phase in the second half of motor current cycle 408, a decreasing negative motor current is driven from driver 120 to stepper motor system 140. Finally, during rising commutation phase in the second half of motor current cycle 406, an increasing negative motor current is driven from driver 120 to stepper motor system 140.

As depicted in FIG. 4, driver 120 may provide current at micro-step levels to stepper motor system 140 in order to replicate a sinusoidal wave. By micro-stepping the current, stepper motor system 140 may move stepper motor shaft 150 in increments rather than with a full force. At the same time, micro-stepping allows for stepper motor system 140 to incrementally move stepper motor shaft 150. Accordingly, micro-stepping may result in smoother operation of the motor.

For an unloaded stepper motor (e.g., stepper motor system 140 operating at normal speed) as displayed in unloaded stepper motor graph 400, motor current 412 is out of phase with motor back-EMF 414 by 90°. In an unloaded motor, there is little-to-no load that is driven by the motor. In particular, during rising commutation phase in first half of motor current cycle 402 for unloaded stepper motor 410, stepper motor system 140 does not receive (or receives substantially little) opposing $V_{bemf}$ 414 as $V_{bemf}$ 414 primarily stays negative during rising commutation phase in first half of motor current cycle 402. However, during falling commutation phase in first half of motor current cycle 402 for unloaded stepper motor 410, stepper motor system 140 receives an opposing $V_{bemf}$ 414.

For a partially-loaded stepper motor as displayed in partially-loaded stepper motor graph 420, motor current 422 is partially out of phase with motor back-EMF 424. In a partially-loaded stepper motor, stepper motor system 140 is driving a load that is less than the maximum load that can be driven by the torque applied. In certain embodiments, a partially-loaded stepper motor is out of phase with motor back-EMF 424 by less than 90°.

For a fully-loaded stepper motor (e.g., stepper motor system 140 is stalled) as displayed in fully-loaded stepper motor graph 430, motor current 432 is substantially in phase with $V_{bemf}$ 434. In a fully loaded motor, stepper motor system 140 drives a load equal or exceeds the maximum load that can be driven by the torque applied by driver 120. In particular, during rising commutation phase in first half of motor current cycle 402 for fully-loaded stepper motor 430, stepper motor system 140 receives an opposing $V_{bemf}$ 414. During falling commutation phase in first half of motor current cycle 402 for fully-loaded stepper motor 430, stepper motor system 140 cumulatively receives a similar opposing $V_{bemf}$ 414 as to the opposing $V_{bemf}$ 414 received during rising commutation phase in first half of motor current cycle 402 for fully-loaded stepper motor 430.

Because stepper motor system 140 cumulatively receives differing amounts of opposing $V_{bemf}$ 414 for the rising phase and falling phase in unloaded stepper motor 410 but cumulatively receives a similar amount of opposing $V_{bemf}$ 434 for the rising phase and falling phase in fully-loaded stepper motor 430, stall detection sensor 130 is able to determine if a motor is stalled by analyzing the difference in opposing $V_{bemf}$ between the rising phase and falling phase of stepper motor system 140. Specifically, if the difference in opposing $V_{bemf}$ between the rising phase and falling phase of stepper motor system 140 is negligible, stall detection sensor 130 detects a stall in stepper motor system 140. However, if a difference in opposing $V_{bemf}$ between the rising phase and falling phase of stepper motor system 140 exists, stall detection sensor 130 determines that stepper motor system 140 is not stalled (e.g., stepper motor system 140 is partially loaded or unloaded).

Figure 5:
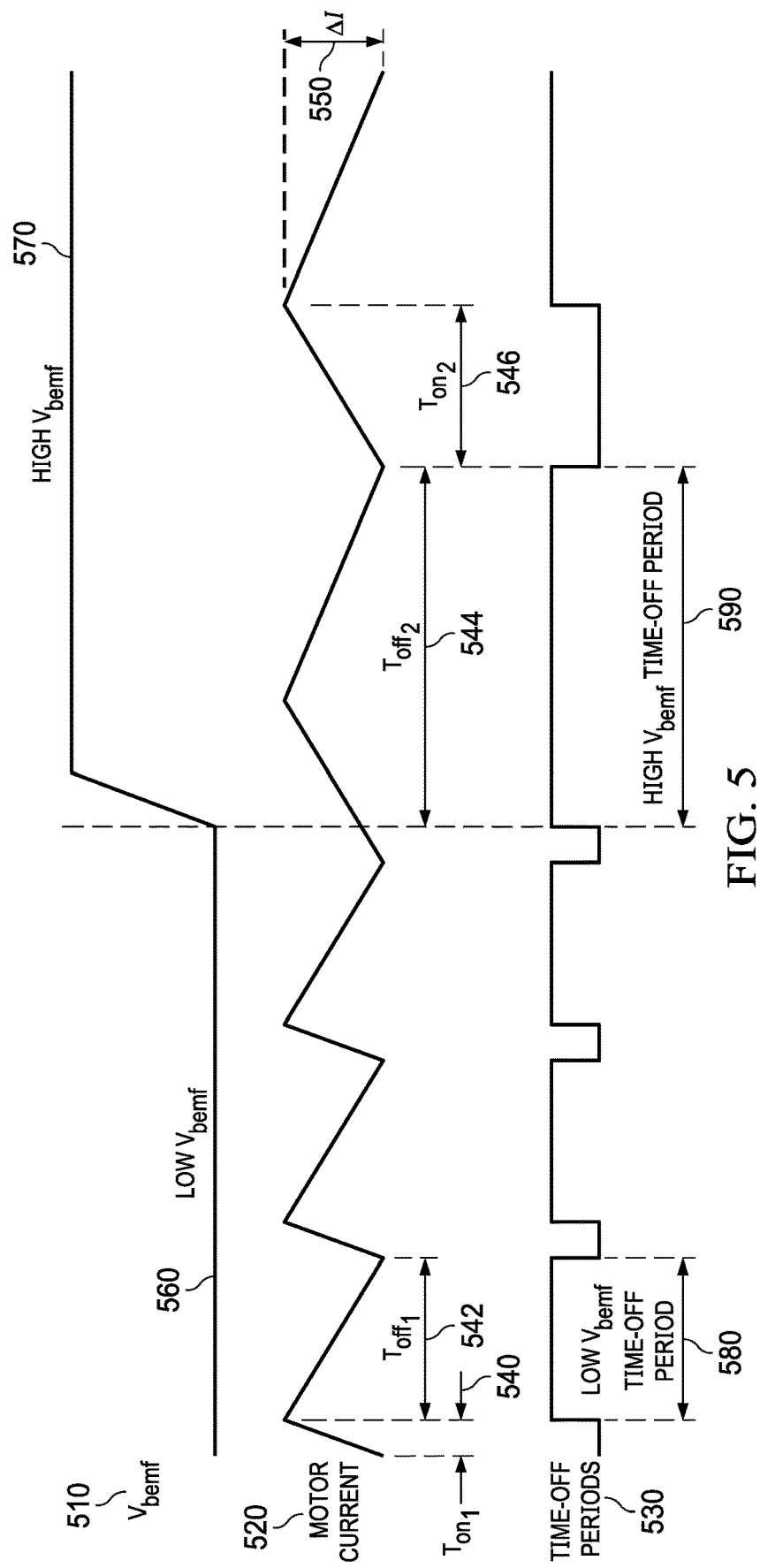
FIG. 5 is a graphical representation of the effect of back-EMF on the time-off period for a stepper motor system using a fixed current ripple during current regulation.

FIG. 5 is a graphical representation of the effect of back-EMF 510 on the time-off period for stepper motor system 140 using a fixed current ripple during current regulation. Driver 120 may provide motor current 520 to first coil 142 and second coil 144 using PWM control. Driver 120 may drive the motor with a series of on pulses (e.g., $T_{on1}$ 340) and off pulses (e.g., $T_{off1}$ 542) during each micro-step. In a fixed current ripple, the change in current amplitude 550 remains constant during current regulation. To increase the speed of stepper motor system 140, driver 120 increases the pulse width of $T_{on}$ 540.

Back-EMF 510 is representative of the back-EMF voltage in stepper motor system 140. Low $V_{bemf}$ 560 is representative of a low back-EMF voltage. In certain embodiments, a low back-EMF voltage may be representative of a stalled motor as stepper motor shaft 150 may slowly be rotating or not rotating at all. On the other hand, high $V_{bemf}$ 570 is representative of a high back-EMF voltage. In certain embodiments, a high back-EMF voltage may be representative of a properly-rotating stepper motor shaft 150.

While stepper motor system 140 is experiencing low $V_{bemf}$ 560, motor current 520 rapidly declines during $T_{off1}$ 542 as compared to $T_{off1}$ 544, because motor current 520 does not face as much opposing back-EMF voltage during $T_{off1}$ 542 as compared to $T_{off1}$ 544. Accordingly, low $V_{bemf}$ time-off period 580 is shorter than high $V_{bemf}$ time-off period 590.

On the other hand, motor current 520 declines at a more gradual rate during $T_{off2}$ 544 as compared to $T_{off1}$ 542 while stepper motor system 140 is experiencing low $V_{bemf}$ 560. Motor current 520 experiences a stronger opposing back-EMF voltage during $T_{off2}$ 544 as compared to $T_{off1}$ 542, thereby preventing motor current 520 from declining rapidly. Accordingly, high $V_{bemf}$ time-off period 590 is longer than low $V_{bemf}$ time-off period 580.

Consequently, the time period for time-off periods 530 provides an indication to the existence of a back-EMF. Based on the existence of a back-EMF, stall detection sensor 130 may determine whether a stall in stepper motor system 140 has occurred.

In an exemplary embodiment, stall detection sensor 130 measures the time period for one or more time-off periods 530 during rising commutation phase in first half of motor current cycle 402 and falling commutation phase in first half of motor current cycle 404. Specifically, for fully-loaded stepper motor 430 that has a similar opposing back-EMF during both the rising phase and falling phase of the motor current cycle, the average length of time-off periods during rising commutation phase in first half of motor current cycle 402 will be similar to the average length of time-off periods during falling commutation phase in first half of motor current cycle 404. On the other hand, for unloaded stepper motor 410 that has more opposing back-EMF during a falling phase than a rising phase of the motor current cycle, the average length of time-off periods during rising commutation phase in first half of motor current cycle 402 will be shorter than the average length of time-off periods during falling commutation phase in first half of motor current cycle 404.

Figure 6:
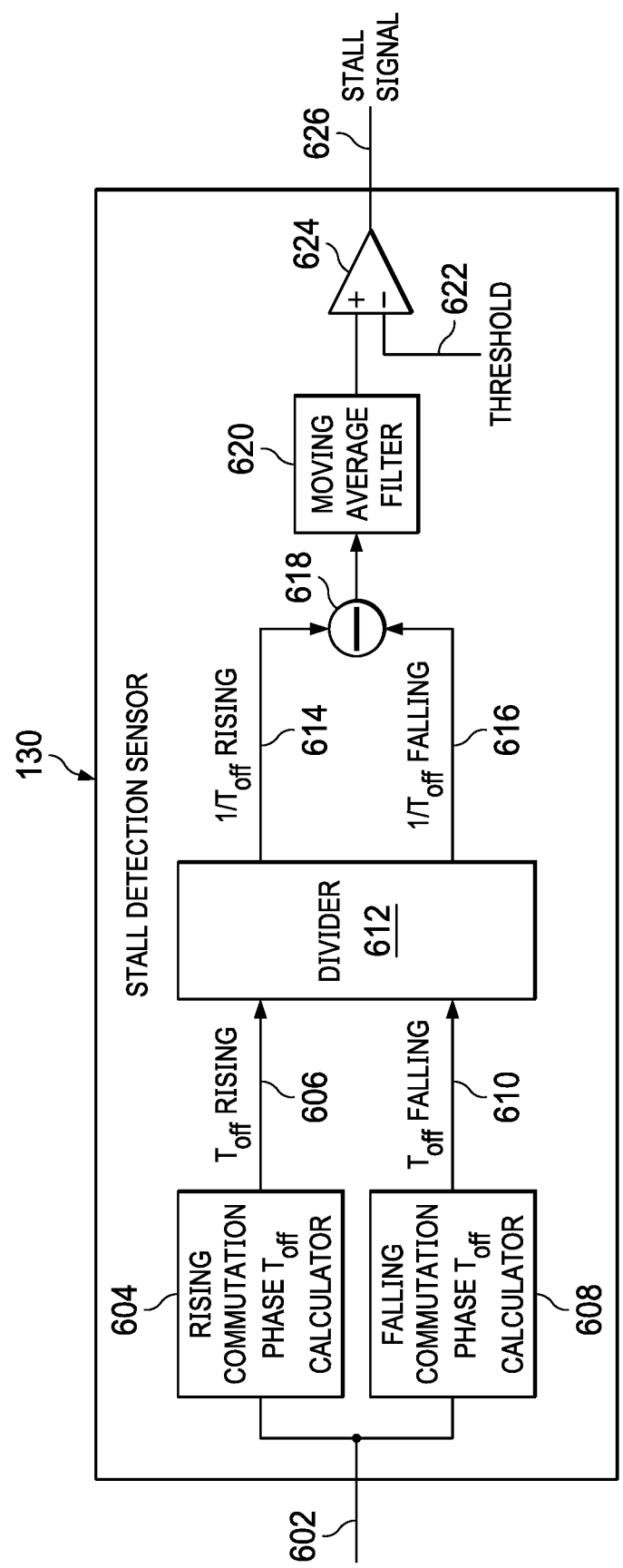
FIG. 6 is a schematic diagram of a stall detection sensor.

FIG. 6 is a schematic diagram of stall detection sensor 130. Input signal 602 may be any signal that allows rising commutation phase $T_{off}$ calculator 604 and falling commutation phase $T_{off}$ calculator 608 to determine a time-off period. In certain embodiments, input signal 602 is a signal communicated to driver 120. For example, input signal 602 may be a STEP signal and/or a DIR signal communicated from controller 110. STEP signal may indicate a step distance to driver 120, and DIR signal may indicate a direction of the step to driver 120.

Rising commutation phase $T_{off}$ calculator 604 determines at least one time-off period during a rising commutation phase. For example, rising commutation phase $T_{off}$ calculator 604 determines at least one time-off period during a rising commutation phase in a first half of a motor current cycle. Moreover, rising commutation phase $T_{off}$ calculator 604 may determine a plurality of time-off periods during a rising commutation phase in a first half of a motor current cycle. In certain embodiments, rising commutation phase $T_{off}$ calculator 604 averages the plurality of time-off periods during a rising commutation phase in a first half of a motor current cycle. In addition, in certain embodiments, rising commutation phase $T_{off}$ calculator 604 may average only a subset of the total time-off periods during a rising commutation phase in a first half of a motor current cycle. In certain embodiments, rising commutation phase $T_{off}$ calculator 604 may also determine a time-off period during a rising commutation phase in a second half of a motor current cycle.

Rising commutation phase $T_{off}$ calculator 604 may output $T_{off\ rising}$ 606 to divider 612. $T_{off\ rising}$ 606 may represent a time-off period during a rising commutation phase in a first half of a motor current cycle. In certain embodiments, $T_{off\ rising}$ 606 may represent an average of a plurality of time-off periods during a rising commutation phase in a first half of a motor current cycle. Moreover, $T_{off\ rising}$ 606 may also represent an average of a plurality of time-off periods during a rising commutation phase in a second half of a motor current cycle.

Falling commutation phase $T_{off}$ calculator 608 determines at least one time-off period during a falling commutation phase. For example, falling commutation phase $T_{off}$ calculator 608 determines at least one time-off period during a falling commutation phase in a first half of a motor current cycle. Moreover, falling commutation phase $T_{off}$ calculator 608 may determine a plurality of time-off periods during a falling commutation phase in a first half of a motor current cycle. In certain embodiments, falling commutation phase $T_{off}$ calculator 608 averages the plurality of time-off periods during a falling commutation phase in a first half of a motor current cycle. In addition, in certain embodiments, falling commutation phase $T_{off}$ calculator 608 may average only a subset of the total time-off periods during a falling commutation phase in a first half of a motor current cycle. In certain embodiments, falling commutation phase $T_{off}$ calculator 608 may also determine a time-off period during a falling commutation phase in a second half of a motor current cycle.

Falling commutation phase $T_{off}$ calculator 608 may output $T_{off\ falling}$ 610 to divider 612. $T_{off\ falling}$ 610 may represent a time-off period during a falling commutation phase in a first half of a motor current cycle. In certain embodiments, $T_{off\ falling}$ 610 may represent an average of a plurality of time-off periods during a falling commutation phase in a first half of a motor current cycle. Moreover, $T_{off\ falling}$ 610 may also represent an average of a plurality of time-off periods during a falling commutation phase in a second half of a motor current cycle.

Divider 612 may be a component that inverts $T_{off\ rising}$ 606 and $T_{off\ falling}$ 610. By inverting $T_{off\ rising}$ 606 and $T_{off\ falling}$ 610, the combination of divider 612 and subtractor 618 is able to make the stall detection sensor 130 less sensitive to motor current and motor resistance. By using $T_{off\ falling}$ 606 (and not $T_{on}$), the first order dependency on supply voltage is eliminated.

The following equations illustrate how the inversion reduces the dependency of stall detection sensor 130 on a wide array of conditions, including changes in supply voltage, motor current, and/or temperature. The following EQ. 1 is used to calculate the change in current ΔI:

$$\Delta I = Toff\left(\frac{IR - Vbemf}{L}\right) \quad (1)$$

where R is the value of the winding resistance, I is the motor current, $V_{bemf}$ is the voltage due to back-EMF, and L is the inductance of the first coil 142 (or second coil 144).

The inverse of the time-off period is given by EQ. 2:

$$\frac{1}{Toff} = \frac{1}{\Delta I \times L}(IR - Vbemf) \quad (2)$$

In other words, $1/T_{off\ rising}$ 614 is the inverse of $T_{off\ rising}$ 606 from rising commutation phase Toff calculator 604. $1/T_{off\ rising}$ 414 is represented by EQ. 3:

$$\frac{1}{Toff\ \text{rising}} = \frac{1}{\Delta I \times L}(IR - Vbemf\ \text{rising}) \quad (3)$$

Similarly, $1/T_{off\ falling}$ 616 is the inverse of $T_{off\ falling}$ 610 from falling commutation phase Toff calculator 608. $1/T_{off\ rising}$ 616 is represented by EQ. 4:

$$\frac{1}{Toff\ \text{falling}} = \frac{1}{\Delta I \times L}(IR - Vbemf\ \text{falling}) \quad (4)$$

By subtracting the inverse of the off-time period for the rising phase (i.e., $1/T_{off\ rising}$ 614) from the inverse of the off-time period for the falling phase (i.e., $1/T_{off\ falling}$ 616) at subtractor 618, the subtraction removes the IR component and, instead, is now relative to the $V_{bemf}$ difference. Accordingly, the current and motor resistance has little effect on the detection of a stall by stall detection sensor 130.

The subtraction of $1/T_{off\ falling}$ 616 from $1/T_{off\ rising}$ 614 results in EQ. 5:

$$\frac{1}{Toff\ \text{falling}} - \frac{1}{Toff\ \text{rising}} = \quad (5)$$
$$\frac{1}{\Delta I \times L}(IR - Vbemf\ \text{falling}) - \frac{1}{\Delta I \times L}(IR - Vbemf\ \text{rising})$$

Accordingly, the current and motor resistance are canceled, and the subtraction of the inverse time periods for the rising and falling phase results in a differential $V_{bemf}$ as seen in EQ. 6:

$$\frac{1}{Toff\ \text{falling}} - \frac{1}{Toff\ \text{rising}} = \frac{1}{\Delta I \times L}(Vbemf\ \text{rising} - Vbemf\ \text{falling}) \quad (6)$$

Next, the subtracted inverse time periods are communicated to moving average filter 620. Moving average filter 620 helps eliminate noise in the subtracted inverse time periods by averaging consecutive samples, thereby reducing the effect noise may have one or more samples.

Finally, the output of moving average filter 620 is sent to comparator 624, where the output of moving average filter 620 is compared against threshold 622. Threshold 622 is a threshold that determines whether the output of moving average filter 620 indicates a stalled motor for stepper motor system 140. For example, a low output of moving average filter 620 may indicate a stalled stepper motor system 140 since the received $V_{bemf}$ for the rising commutation phase is similar to the received $V_{bemf}$ for the falling commutation phase. As another example, a substantially non-zero output of moving average filter 620 may indicate a properly functioning stepper motor system 140 as the received $V_{bemf}$ for the rising commutation phase is smaller in relation to the received $V_{bemf}$ for the falling commutation phase. Threshold 622 is either an adaptive or set threshold. In certain embodiments, threshold 622 may be based on the difference between $T_{off\ rising}$ 606 and $T_{off\ falling}$ 612. In an alternate embodiment, threshold 622 may be set at a configuration period based on an initial stall. In certain embodiments, threshold 622 is a counter.

Stall signal 626 is an identifier communicated from stall detection sensor 130 that identifies whether stepper motor system 140 is stalled.

Figure 7:
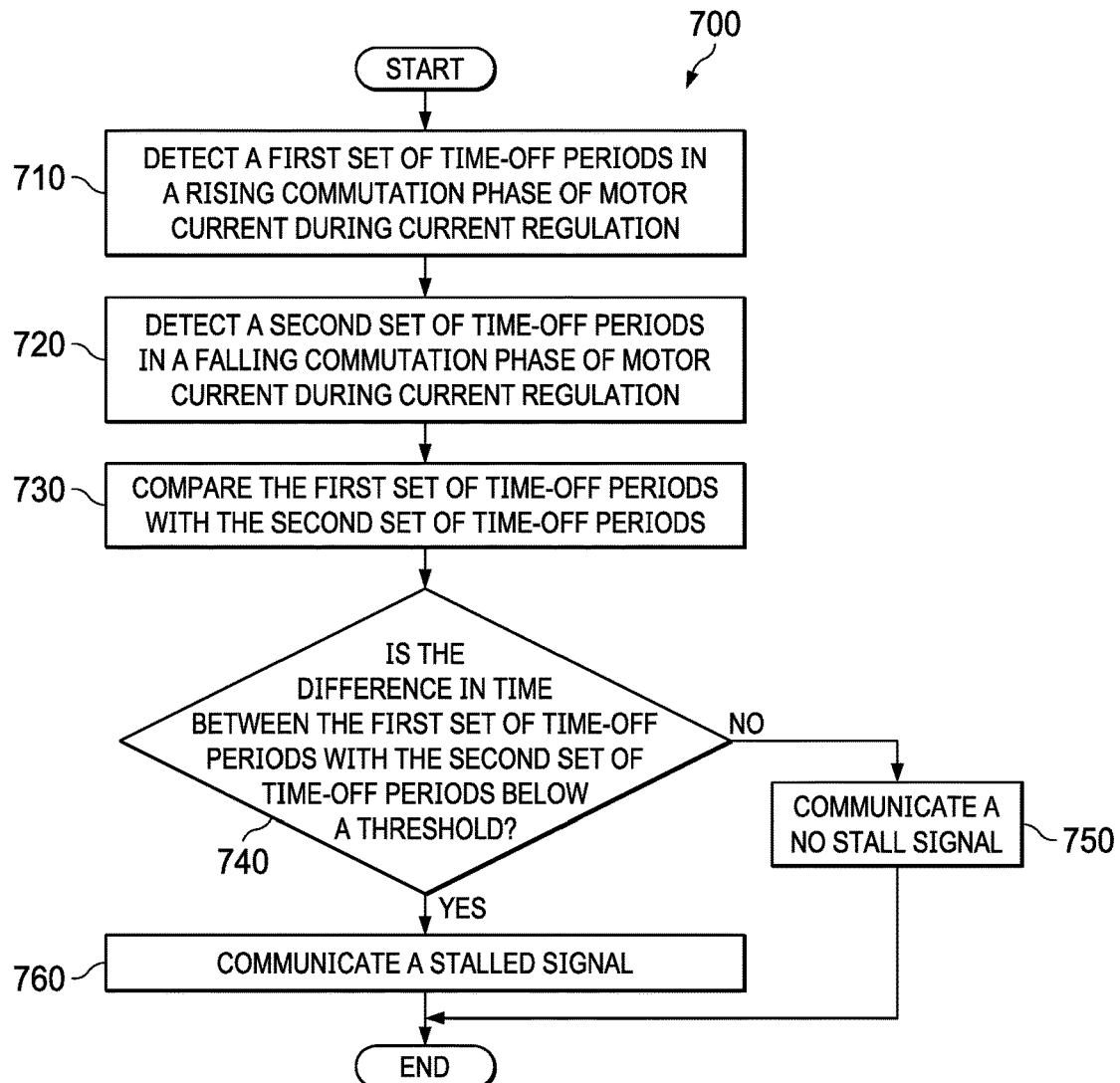
FIG. 7 illustrates an example method for detecting a stall in a stepper motor system.

FIG. 7 illustrates an example method 700 for detecting a stall in stepper motor system 140. The method may begin at step 710, where stall detection sensor 130 detects a first set of time-off periods in a rising commutation phase of motor current during current regulation. In certain embodiments, the first set of time-off periods is a first set of time-off periods in a rising commutation phase in a first half of a motor current cycle.

At step 720, stall detection sensor 130 detects a second set of time-off periods in a fall commutation phase of motor current during current regulation. In certain embodiments, the second set of time-off periods is a second set of time-off periods in a falling commutation phase in a first half of a motor current cycle.

At step 730, stall detection sensor 130 compares the first set of time-off periods with the second set of time-off periods. In addition, in certain embodiments, stall detection sensor 130 compares an average of the first set of time-off periods with an average of the second set of time-off periods. In particular embodiments, stall detection sensor 130 compares an inverse of the average of the first set of time-off periods with an inverse of the average of the second set of time-off periods.

At step 740, stall detection sensor 130 determines whether stepper motor system 140 is stalled based on the comparison of the first set of time-off periods with the second set of time-off periods. In particular embodiments, stall detection sensor 130 determines whether stepper motor system 140 is stalled by comparing the first set of time-off periods with the second set of time-off periods and determining that stepper motor system 140 is stalled when a difference in time between the first set of time-off periods and the second set of time-off periods is below a threshold.

At step 750, stall detection sensor 130 communicates a no stall signal when the difference between the first set of time-off periods with the second set of time-off periods is not below a threshold.

On the other hand, if stall detection sensor 130 determines that the difference between the first set of time-off periods with the second set of time-off periods is below a threshold, stall detection sensor 130 may communicate a stall signal indicating that stepper motor system 140 is stalled.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for detecting a stall in stepper motor system 140 including the particular steps of the method of FIG. 7, this disclosure contemplates any suitable method for detecting a stall in stepper motor system 140 including any suitable steps, which may include all, some, or none of the steps of the method of FIG. 7, where appropriate. For example, in additional embodiments, stall detection sensor 130 may detect a third set of time-off periods in a rising commutation phase in a second half of a motor current cycle during current regulation. Moreover, stall detection sensor 130 detects a fourth set of time-off periods in a falling commutation phase in the second half of the motor current cycle. Moreover, stall detection sensor 130 may then compare the third set of time-off periods with the fourth set of time-off periods. In addition, in certain embodiments, stall detection sensor 130 may also determine whether stepper motor shaft 150 is stalled based on the comparison of the third set of time-off periods with the fourth set of time-off periods.

Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

The present disclosure may also be a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit ("ASIC"), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit ("CPU"), an integrated circuit ("IC"), a graphics processing unit ("GPU"), etc.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction.

The scope of this disclosure is not limited to the example embodiments described or illustrated herein. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   detecting, by a stall detection sensor, a first time-off period in a rising commutation phase of a stepper motor current;
   detecting, by the stall detection sensor, a second time-off period in a falling commutation phase of the stepper motor current;
   comparing, by the stall detection sensor, the first time-off period with the second time-off period; and
   in response to the comparison, determining, by the stall detection sensor, a stall condition.

2. The method of claim 1 wherein:
   the first time-off period is a first plurality of time-off periods in the rising commutation phase of the stepper motor current; and
   the second time-off period is a second plurality of time-off periods in the falling commutation phase of the stepper motor current.

3. The method of claim 2 wherein:
   the first time-off period is a first average of the first plurality of time-off periods; and
   the second time-off period is a second average of the second plurality of time-off periods.

4. The method of claim 2 wherein:
   the first time-off period is a first average of a first subset of the first plurality of time-off periods; and
   the second time-off period is a second average of a second subset of the second plurality of time-off periods.

5. The method of claim 1 wherein:
   the stall condition is stalled when a difference in time between the first time-off period and the second time-off period is below a threshold; and
   the stall condition is not stalled when a difference in time between the first time-off period and the second time-off period is above the threshold.

6. The method of claim 5 wherein:
   the threshold is a counter.

7. The method of claim 5 wherein:
   the threshold is an adaptive threshold based on at least one of the difference in time between the first time-off period and the second time-off period is below a threshold.

8. The method of claim 1 wherein:
   the stepper motor current is regulated by fixed current ripple regulation.

9. The method of claim 1 wherein:
   the comparing of the first time-off period with the second time-off period includes inverting the first time-off period to generate an inverted first time-off period and inverting the second time-off period to generate an inverted second time-off period.

10. The method of claim 9 wherein:
    the comparing of the first time-off period with the second time-off period includes subtracting the second time-off period from the first time-off period to generate an inverted difference.

11. The method of claim 10 wherein:
    the comparing of the first time-off period with the second time-off period includes filtering the inverted difference with a moving average filter.

12. A stall detection sensor, comprising:
    a first time-off phase calculator configured to receive a motor control input and to output a first time-off period based on the motor control input;
    a second time-off phase calculator configured to receive the motor control input and to output a second time-off period based on the motor control input;
    a subtractor configured to receive the first time-off period and the second time-off period, the subtractor configured to output a difference; and a comparator configured to receive the difference and compare the difference with a threshold, the comparator configured to output a stall identifier.

13. The stall detection sensor of claim 12 further comprising a divider; and wherein:
    the first time-off period is coupled to the divider;
    the first time-off period is inverted by the divider;
    the second time-off period is coupled to the divider; and
    the second time-off period is inverted by the divider.

14. The stall detection sensor of claim 12, wherein:
    the motor control input is communicated to a driver.

15. The stall detection sensor of claim 14,
    wherein: the motor control input is transmitted from a controller; the motor control input indicates a distance for a step to the driver.

16. The stall detection sensor of claim 15, wherein:
    the motor control input indicates a direction of the step to the driver.

17. The stall detection sensor of claim 12,
    wherein: the threshold is a counter.

18. The stall detection sensor of claim 12,
    wherein: the threshold is an adaptive threshold.

19. The stall detection sensor of claim 12 wherein:
    the stall identifier indicates a motor is stalled when the difference is below the threshold; and
    the stall identifier indicates the motor is not stalled when the difference is above the threshold.

* * * * *